(12) United States Patent
Ryu et al.

(10) Patent No.: US 7,281,059 B2
(45) Date of Patent: Oct. 9, 2007

(54) METHOD FOR USING A UNIQUE IP ADDRESS IN A PRIVATE IP ADDRESS DOMAIN

(75) Inventors: Young-Gyu Ryu, Suwon-shi (KR); Gi-Sik Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 706 days.

(21) Appl. No.: 09/943,194

(22) Filed: Aug. 30, 2001

(65) Prior Publication Data

US 2002/0038382 A1 Mar. 28, 2002

(30) Foreign Application Priority Data

Sep. 8, 2000 (KR) ................ 2000-53543

(51) Int. Cl.
*G06F 15/16* (2006.01)
(52) U.S. Cl. .............. 709/245; 709/220; 709/222; 709/223
(58) Field of Classification Search .......... 709/220, 709/222, 223, 245
See application file for complete search history.

(56) References Cited

U.S. PATENT DOCUMENTS

| 5,159,592 | A | * | 10/1992 | Perkins ................... 370/338 |
| 5,724,511 | A | * | 3/1998 | Moritomo ................ 709/245 |
| 5,790,548 | A | * | 8/1998 | Sistanizadeh et al. ....... 370/401 |
| 6,006,272 | A | * | 12/1999 | Aravamudan et al. ...... 709/245 |
| 6,456,625 | B1 | * | 9/2002 | Itoi ........................ 370/401 |
| 6,522,654 | B1 | * | 2/2003 | Small ...................... 370/400 |
| 6,678,732 | B1 | * | 1/2004 | Mouko et al. ............. 709/227 |
| 6,684,243 | B1 | * | 1/2004 | Euget et al. .............. 709/222 |
| 6,763,012 | B1 | * | 7/2004 | Lord et al. ................ 370/338 |

FOREIGN PATENT DOCUMENTS

| JP | 10-247946 | 9/1998 |
| JP | 2000-101589 | 4/2000 |

OTHER PUBLICATIONS

R. Droms, "Dynamic Host Configuration Protocol", Bucknell University, Mar. 1997.
European Search Report dated Oct. 9, 2003 issued in a counterpart application, namely, Appln. No. 01121575.3.

* cited by examiner

*Primary Examiner*—Moustafa Meky
*Assistant Examiner*—Avi Gold
(74) *Attorney, Agent, or Firm*—The Farrell Law Firm, P.C.

(57) ABSTRACT

Disclosed is a method for using a unique IP address for a limited period of time in a device connected to a LAN which includes a router and a LAN device. In the method, the LAN device sends a unique IP address request to the router to be allocated a unique IP address, when the LAN device needs a unique IP address. The LAN device returns the allocated unique IP address to the router after using the allocated unique IP address.

10 Claims, 6 Drawing Sheets

METHOD FOR USING A UNIQUE IP ADDRESS IN A PRIVATE IP ADDRESS DOMAIN

PRIORITY

This application claims priority to an application entitled "Method for Using Unique IP Address in a Private IP Address Domain" filed in the Korean Industrial Property Office on Sep. 8, 2000 and assigned Serial No. 2000-53543, the contents of which are hereby incorporated by reference.

BACKGROUND OF THE INVENTION

1. Field of the Invention

The present invention relates generally to a method for using an IP (Internet Protocol) address, and in particular, to a method for using a unique IP address in a private IP address domain.

2. Description of the Related Art

In general, a data packet is comprised of transmission data, at least one header and a footer of a lower layer, the header and the footer surrounding the transmission data. First, a header (of an application layer) for identifying an application is attached to the data, and then, a header (of a transport layer) for identifying a port and a protocol is attached to the resulting header-attached data. A network layer identifies the devices in the transmission side and the reception side using a network address such as an IP address. Finally, data link layer information is included in the data packet. In an Internet application, the network layer includes IP addresses of the transmission side device and the reception side device, and for correct transmission, these addresses should be unique addresses. However, because of the limitation on the number of possible addresses, it is not possible to allocate the unique IP address to every device on the Internet. One method for reducing a demand for the IP addresses is to use network address translation (NAT). In order to use NAT, it is necessary to allocate unique IP addresses to the devices connected to the Internet through a gateway such as a router. For example, the device connected to the Internet through a local area network (LAN) and the router, has an IP address that is unique only between the device and the router, and is not unique on the Internet. In the following description, the device having a unique IP address will be referred to as a "LAN device" for convenience of explanation.

A brief description of the NAT will be made below. In Internet communication, the respective LAN devices have different IP addresses, thus making it possible to identify the devices. However, not having a unique IP address, the LAN device cannot transmit a packet directly to the reception side over the Internet communication. Even though the packet is directly transmitted to the reception side, the device cannot receive a response to the transmitted packet. Instead, when it is desired to transmit a packet, the device includes its non-unique IP address, i.e., a source address (SA) in the network layer header and then transmits this packet to the router. The router removes this SA and instead, inserts its unique IP address, i.e., a router source address (RSA). The router registers SA, DA (Destination Address), SP (Source Port), DP (Destination Port) and PT (Protocol Type) of the network layer and the transport layer in a packet, and then, transmits the packet to the reception side over the Internet. Every response from the reception side includes SA2, DA2, SP2, DP2 and PT2. When the packet has been transmitted by the router, SA2 has a value of DA and DA2 has a value of RSA. The router searches the LAN address of the device that has transmitted this packet, by consulting the first registered SA, DA, SP, DP and PT, changes the reception address of the packet from RSA to SA, and then, transmits the changed address to the LAN device.

Although it is possible to solve the IP address limitation problem to some extent using the above method, there are some applications it cannot be used in. This is because upon failure to receive a response to an IP allocation request, it is not possible to transmit a packet to the device connected to the LAN through the Internet. Further, since the transmission side can transmit the packet only with the unique IP address, it is only possible to transmit the packet using the router.

However, the router does not know to which LAN device this packet should be transmitted.

In addition, a problem occurs even when an application transmits its IP address to the other party. When the LAN device transmits a LAN IP address, the reception side cannot transmit a response to the transmission side using this address. As one example of this case, there is an ITU (International Telecommunication Union) H.323 protocol. In the ITU H.323 protocol, the transmission side transmits an IP packet with its own IP address to the other party, and the reception side performs communication with the transmission side using this address. In this case, the LAN device cannot receive a response from the reception side, because the LAN device knows only the LAN IP address. In order to make such communication available, the router must change the IP address of the LAN device to the unique IP address by examining every packet, and must also perform a reverse operation thereof. This overloads the router.

Meanwhile, when the LAN device desires to statically use the unique IP address, the router can statically allocate one unique IP address to a specific LAN device. In this case, the router performs only an operation of converting the LAN IP address of the packet to the unique IP address and converting the unique IP address to the LAN IP address.

As stated above, when the device connected to the LAN is not allocated the unique IP address, it cannot receive a response from the other party even though the application transmits its own IP address to the other party. Further, the router must convert the IP address by examining every packet.

SUMMARY OF THE INVENTION

It is, therefore, an object of the present invention to provide a method for using a unique IP address for a limited period of time in a device connected to a LAN.

To achieve the above and other objects, a method for using an IP address on a LAN including a router and a LAN device is provided. In the method, when the LAN device needs a unique IP address, it sends a unique IP address request to the router to be allocated a unique IP address. The LAN device returns the allocated unique IP address to the router after using the allocated unique IP address. To this end, the LAN device supports a procedure for requesting a unique IP address and returning the unique IP address after using it. Further, the router supports a procedure for allocating a unique IP address upon receipt of a unique IP address request from the LAN device, and registering a unique IP address returned from the LAN device for future use.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
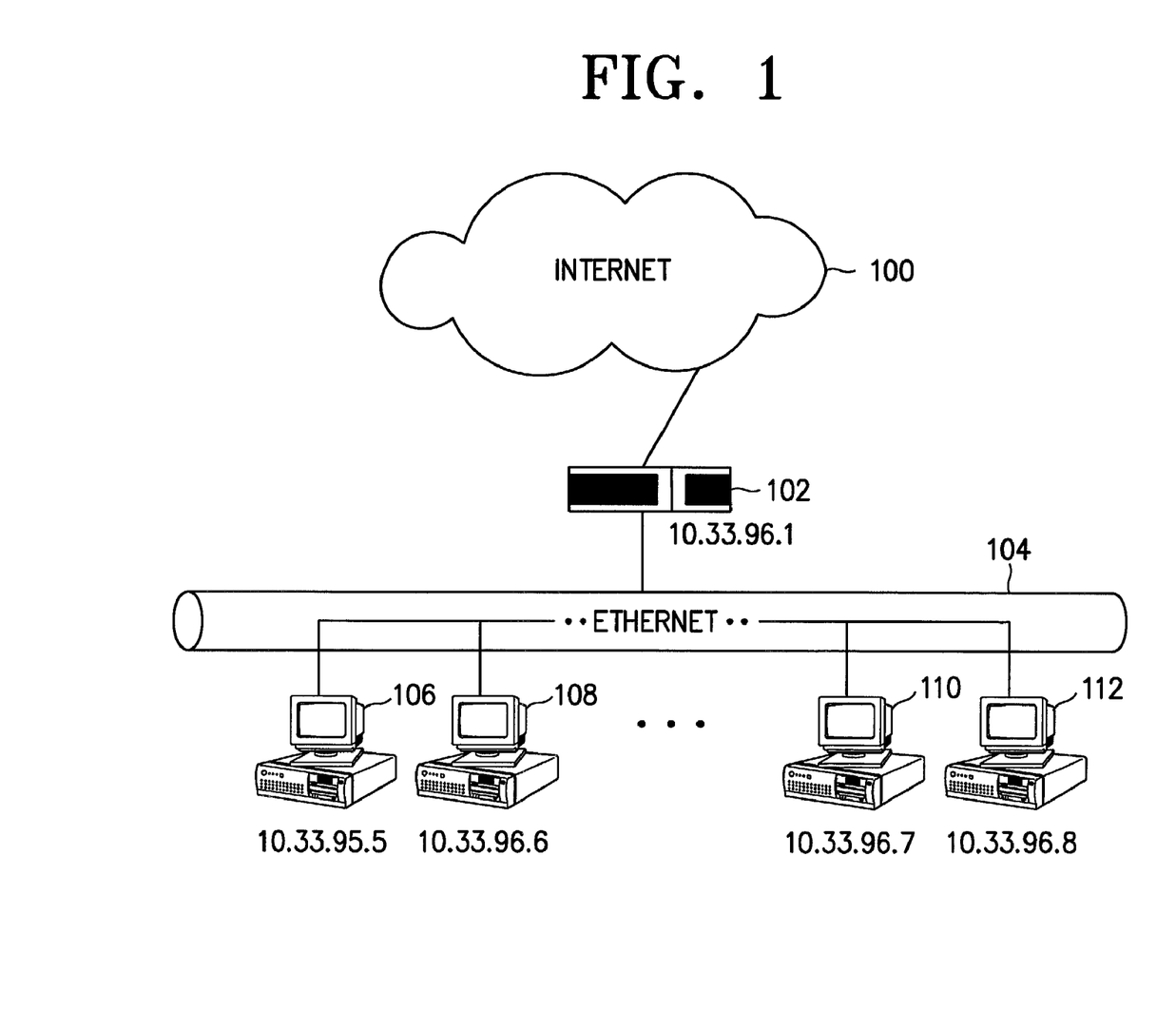
FIG. 1 is a diagram illustrating a LAN connection to which the present invention is applicable.

FIG. 1 illustrates a LAN connection diagram to which the present invention is applicable. In the LAN connection, a router 102 is connected to a plurality of LAN devices 106-112, which are terminal devices, through Ethernet 104. Specifically, FIG. 1 shows an exemplary case where the router 102 is connected to the Internet 100 and has an IP address of 10.33.96.1 and the LAN devices 106-112 have their IP addresses of 10.33.96.5, 10.33.96.6, 10.33.96.7, and 10.33.96.8, respectively. In addition, the router 102, as shown in Table 1 below, has static unique IP addresses of 192.1.1.1, 192.1.1.2 and 192.1.1.3, and dynamic unique IP pools of 192.1.1.4, 192.1.1.5, and 192.1.1.6.

TABLE 1

| Static IP Address | Dynamic IP Pool |
|---|---|
| 192.1.1.1 | 192.1.1.4 |
| 192.1.1.2 | 192.1.1.5 |
| 192.1.1.3 | 192.1.1.6 |

The static unique IP addresses are statically (or fixedly) allocated to the associated LAN devices 106-112. The IP addresses of the dynamic IP pools are dynamically allocated to the associated LAN devices by the router 102 when an IP allocation request is received from any one of the LAN devices 106-112. This is only the difference of the unique IP address allocation method performed by the router 102, and routing of the data packet is performed in the same method. That is, if the unique IP address 192.1.1.1 is used by 10.33.96.5, the router 102 replaces SA of the packet with 192.1.1.1 and transmits it to the Internet 100, in order to transmit the packet transmitted from 10.33.96.5 to the Internet 100. In addition, when a packet with DA of 192.1.1.1 is received from the Internet 100, DA is changed to 10.33.96.5 and then transmitted to the LAN device. The router 102 additionally has at least one unique IP address that can be used by the LAN device that does not have its unique IP address. A description of these addresses will be avoided herein, for simplicity.

When the terminal device does not need a unique IP address, the terminal device operates in the conventional method. That is, if the LAN device transmits a packet, the router 102 changes the IP address of the packet so as to enable the LAN device to access the Internet.

When the LAN device desires to use the unique IP address, there are two possible methods as follows. One method is to statically allocate a unique IP address to one device. For example, the unique IP address 192.1.1.1 is used by the device having the LAN IP address of 10.33.96.5. The other method, a method proposed by the invention, is to dynamically allocate the unique IP address. When the LAN device, which is not statically allocated the unique IP address, desires to use the unique IP address (for example, in the case of an ITU H.323 call), the LAN device is allocated a unique IP address from the router 102.

This procedure can be divided into the following three steps.

Step 1: The LAN device sends a unique IP address request to the router 102 and is allocated a unique IP address.

Step 2: An Internet application transmits and receives data. When it is necessary to transmit the data with the unique IP address, the application uses the allocated unique IP address and the router 102 transmits and receives the packet according to the allocated unique IP address.

Step 3: After use of the unique IP address, the LAN device returns the allocated unique IP address to the router 102.

Figure 6:
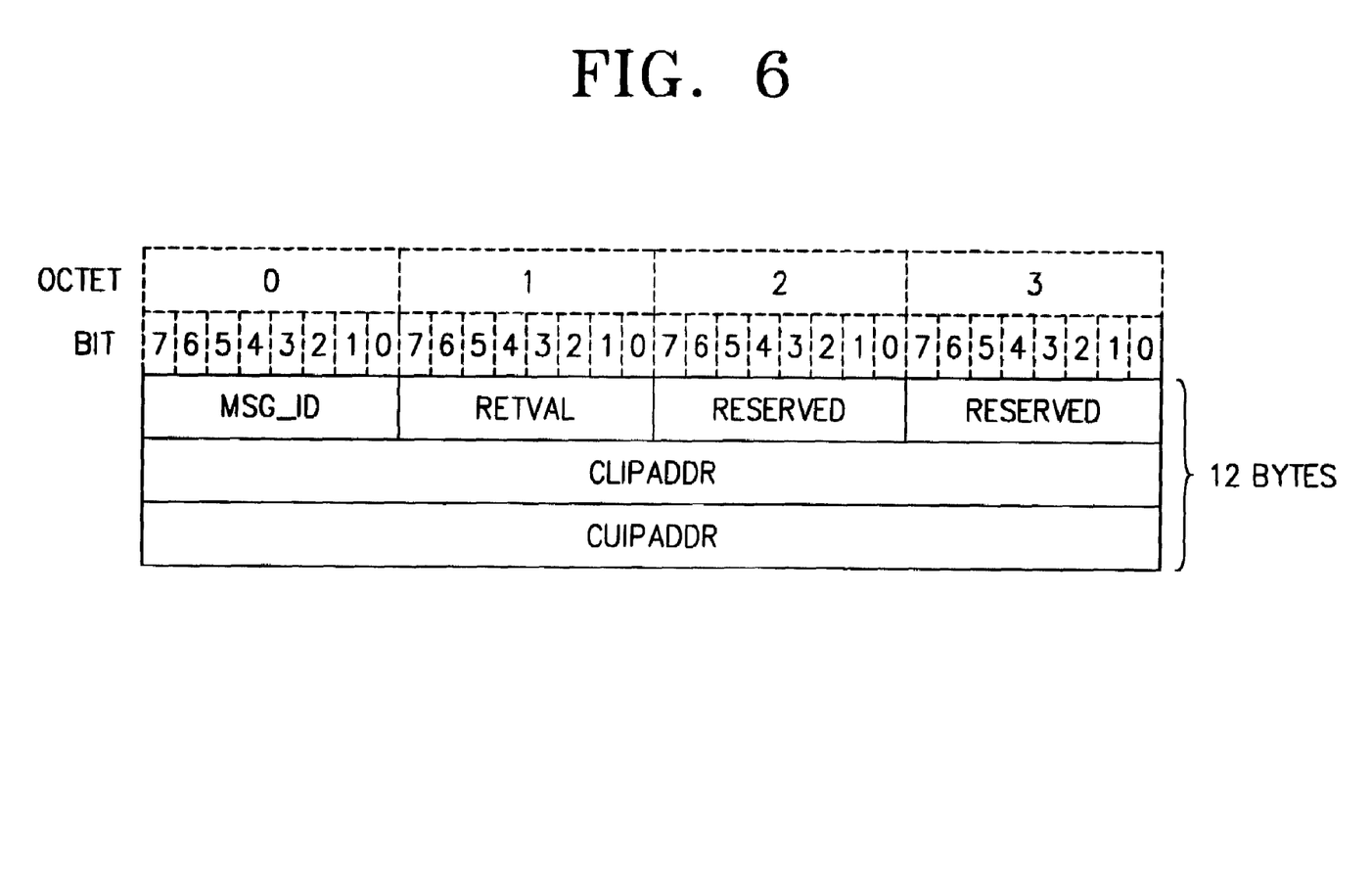
FIG. 6 is a diagram illustrating a message format according to an embodiment of the present invention.

Now, messages to be used for requesting, allocating and returning the unique address will be defined. An IP allocation request message Unique_IP_Req is a message used when the LAN device sends a unique IP address allocation request to the router 102. A response message Unique_IP_Res includes a response message that the router 102 sends to the LAN device in response to the IP allocation request message Unique_IP_Req, an availability of a unique IP address, and the unique IP address if available. An IP return message Unique_IP_Ret is a message used when the LAN device returns the unique IP address allocated from the router 102. A structure of these messages, as illustrated in FIG. 6, is comprised of a 1-byte message type field 'msg_id', a 1-byte response field 'retval', a 2-byte reserved field 'reserved', a 4-byte client local IP address field 'clipaddr' and a 4-byte client unique IP address field 'cuipaddr'. The 'msg_id' field indicates the message type, and has one of the values 0, 1 and 2. When 'msg_id'=0, it indicates the IP allocation request message Unique_IP_Req; when 'msg_id'=1, it indicates the response message Unique_IP_Res; and when 'msg_id'=2, it indicates the IP return message Unique_IP_Ret. The 'retval' field is used only in the response message Unique_IP_Res, and has a value of 0 or 1. When 'retval'=0, it indicates that there is no unique IP address to be allocated. When 'retval'=1, it indicates that the unique IP address is allocated, and in this case, the unique IP address is written in the 'cuipaddr' field. The 'clipaddr' field is used in the response message Unique_IP_Res and the IP return message Unique_IP_Ret. In the response message Unique_IP_Res, the 'clipaddr' indicates a LAN IP address of the LAN device that has requested the unique IP address. In the IP return message Unique_IP_Ret, the 'clipaddr' indicates a LAN IP address of the LAN device that has returned the unique IP address. The 'cuipaddr' field is used in the response message Unique_IP_Res and the IP return message Unique_IP_Ret. In the response message Unique_IP_Res, the 'cuipaddr' indicates a LAN IP address of the LAN device that has returned the unique IP address. In the IP return message Unique_IP_Ret, the 'cuipaddr' indicates a unique IP address that the LAN device intends to return.

In the message structure of FIG. 6, the lower layer part is omitted. However, a user datagram protocol (UDP) is used as a transport layer and a port number 1033 is used. The port number can be varied in an implementation.

Figure 2:
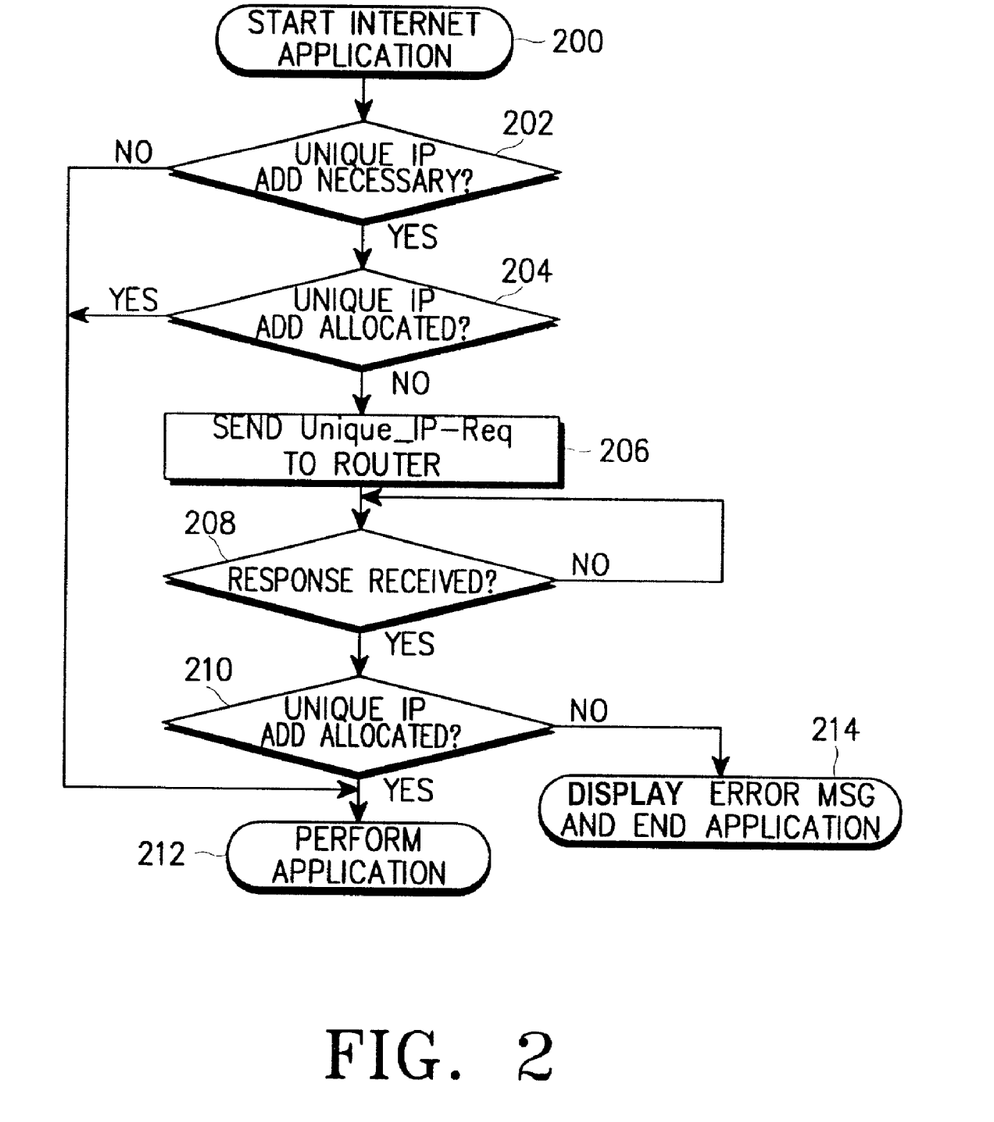
FIG. 2 is a flow chart illustrating a procedure for requesting and allocating a unique IP address of a LAN device according to an embodiment of the present invention.

The procedure for requesting and allocating the unique IP address using the above messages can be divided again into a procedure performed in the LAN devices 106-112 and a procedure performed in the router 102. The procedure in which the LAN device sends a unique IP address request to the router 102 to be allocated the unique IP address, is shown by steps 200-214 of FIG. 2. Referring to FIG. 2, when the Internet application is started in step 200, the LAN device determines in step 202 whether it is necessary to use a unique IP address. If a unique IP address is not necessary, the LAN device performs the application using the LAN IP in step 212. Otherwise, if a unique IP address is necessary, the LAN device determines in step 204 whether a unique IP address has already been allocated thereto. If the unique IP address has been allocated, the LAN device performs the application using the LAN IP in step 212. Otherwise, if the unique IP address has not been allocated, the LAN device sends a unique IP address request to the router 102 in step 206. This request is performed by sending the IP allocation request message Unique_IP_Req. Thereafter, in step 208, the LAN device awaits a response from the router 102. The router 102 transmits the response message Unique_IP_Res in response to the unique IP address request, and specifies in the response message as to whether the unique IP address is available. Upon receipt of the response message in step 208, the LAN device determines in step 210 whether the unique IP address is allocated or not. If the unique IP address is allocated thereto, the LAN device performs the application in step 212. Otherwise, the LAN device displays an error message and then ends the application in step 214.

Figure 3:
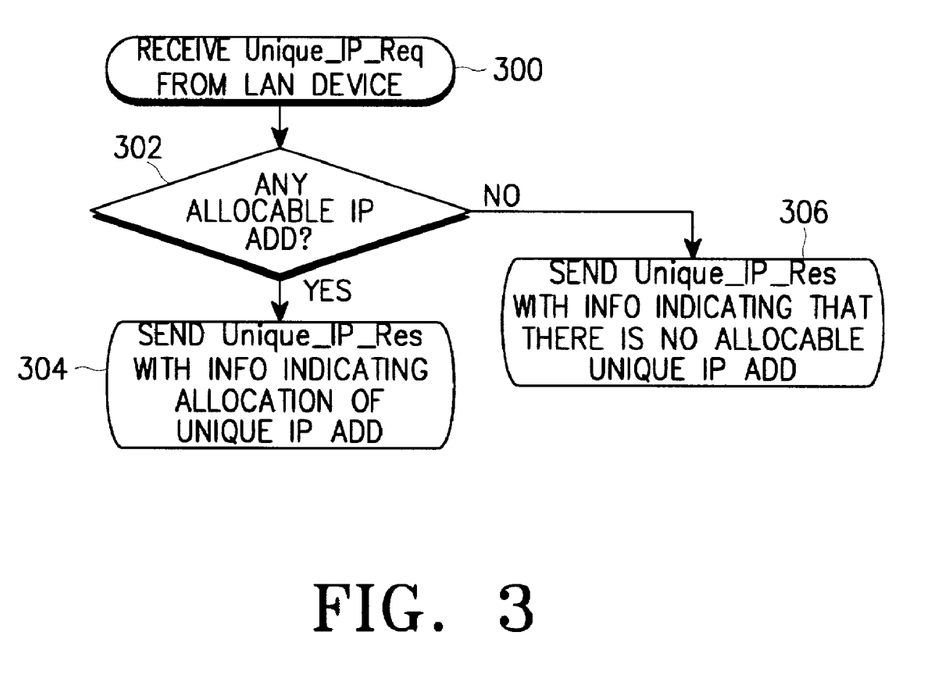
FIG. 3 is a flow chart illustrating a procedure for allocating a unique IP address, performed in a router according to an embodiment of the present invention.

FIG. 3 illustrates a procedure for allocating the unique IP address, performed in the router 102. Upon receipt of the IP allocation request message Unique_IP_Req from any one of the LAN devices 106-112 in step 300, the router 102 examines the dynamic unique IP pools shown in Table 1 in step 302, to determine whether there is an unused (or allocable) unique IP address. If there is an allocable unique IP address, the router 102 sends a response message Unique_IP_Res with the information indicating allocation of the unique IP address, in step 304. However, if there is no allocable unique IP address, the router 102 sends a response message Unique_IP_Res with the information indicating that there is no allocable unique IP address, in step 306. After allocation of the unique IP address, the router 102 stores in its internal memory the unique IP address allocation status in the form of a table shown in Table 2 below.

TABLE 2

| Index | LAN IP Address | Dynamic IP Pool |
|---|---|---|
| 1 | 10.33.96.5 | 192.1.1.1 |
| 2 | 10.33.96.6 | 192.1.1.2 |
| 3 | 10.33.96.7 | 192.1.13 |

The table illustrated in Table 2 has one use for storing the unique IP address allocation status and another use for consulting when routing the data packet. The "Index" in the first column indicates the order of the unique IP address allocation status stored in the table or the addresses in the memory. In the second column, the LAN IP addresses are stored. These addresses are used as a key for searching the table. After allocating a unique IP address upon receipt of the unique IP address allocation request, the router 102 registers the LAN IP address and the allocated unique IP address. Thereafter, when the LAN device returns the unique IP address, the router 102 deletes the LAN IP address and the unique IP address from the table. In addition, in this table, the statically allocated unique IP addresses are also stored.

After being allocated the unique IP address, the LAN device uses the intact LAN IP address without changing the IP address. Even though the IP address is not changed, transmission/reception of the data packet between the Internet 100 and the LAN devices is performed by the router 102. However, when it is necessary for the application to send its own IP address to a remote terminal through the Internet 100, the application should send the unique IP address allocated from router 102.

When the router 102 routes the packet, the router 102 constantly consults the table shown in Table 2 regardless of whether the unique IP address is used or not. The packet routing procedure is shown by FIGS. 4 and 5.

Figure 4:
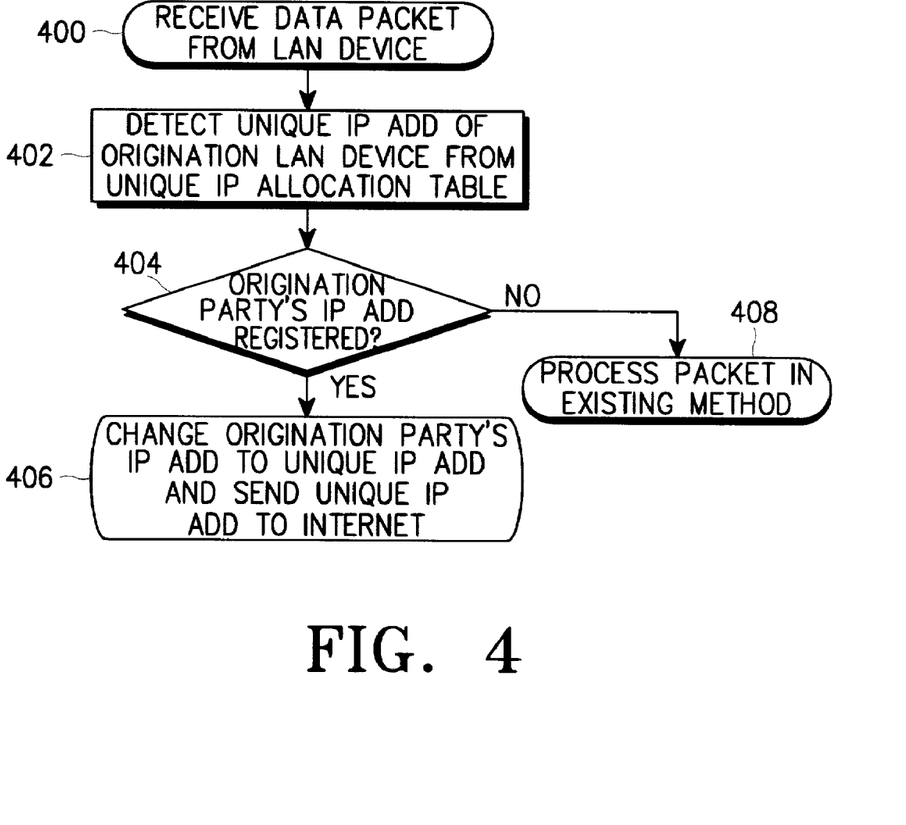
FIG. 4 is a flow chart illustrating a procedure for routing a data packet transmitted from the LAN to the Internet by the router according to an embodiment of the present invention.

FIG. 4 illustrates a procedure for routing the packet transmitted from the LAN device to the Internet 100, performed in the router 102. Upon receipt of a packet in step 400, the router 102 determines in steps 402 and 404 whether the origination party's IP address is registered in the LAN IP column of the unique IP allocation table shown in Table 2. When the origination party's IP address is not registered in the table, which means a case where the unique IP address is not used, the router 102 stores the IP address, port and protocol in the conventional method and then retransmits them to the Internet 100, in step 408. Otherwise, when the origination party's IP address is registered in the table, the router 102 changes the origination party's IP address of the packet to a unique IP address allocated to the corresponding IP and then retransmits it to the Internet 100, in step 406.

Figure 5:
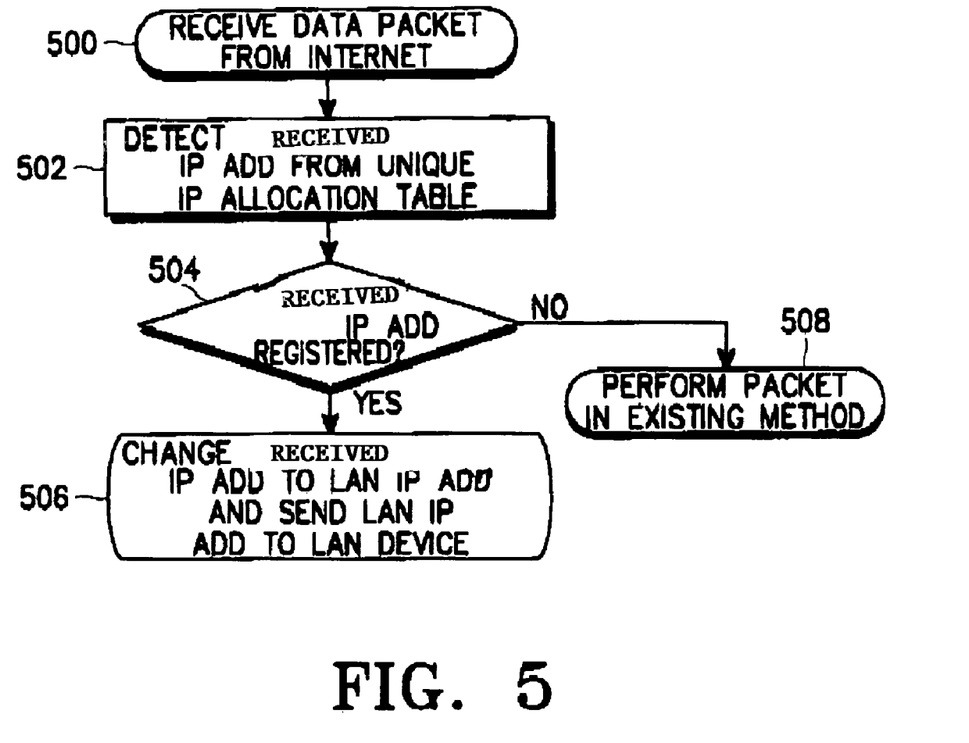
FIG. 5 is a flow chart illustrating a procedure for routing a data packet transmitted from the Internet to the LAN by the router according to an embodiment of the present invention.

FIG. 5 shows a procedure for retransmitting the packet received from the Internet 100 to the LAN device, performed by the router 102. Upon receipt of a data packet from the Internet 100 in step 500, the router 102 determines in steps 502 and 504 whether the received IP address is registered in the unique IP address column of the unique IP allocation table shown in Table 2. If the received IP address is not registered in the table, which means a case where the unique IP address is not used, the router 102 determines the reception LAN device according to the IP address, port and protocol registered in the conventional method, changes the received IP address of the packet and then retransmits it to the LAN device, in step 508. However, if the received IP address is registered in the table, the router 102 changes the received IP address of the packet to a LAN IP address to which the corresponding unique IP address is allocated, and then retransmits it to the LAN device, in step 506.

If it is not necessary to use the allocated unique IP address, for example, if the ITU H.323 call is ended, the LAN device returns the unique IP address so that the other LAN devices can use it. The LAN device transmits to the router 102 the IP return message Unique_IP_Ret in which the unique IP address to be returned is specified. Upon receipt of this message, the router 102 detects the unique IP address from the unique IP allocation table shown in Table 2 and deletes from the unique IP address and the LAN IP address to which the address is allocated. Accordingly, the router 102 can replace the unique IP address in the unique IP address pool shown in Table 1 so that it can be used at the next request.

Several exceptional cases may occur based on the foregoing procedures. For example, when the router is connected to another LAN as one device rather than being connected to the Internet, constructing a sub-network, there are things to be considered between the router using the unique IP address and the LAN device, such as a method for requesting, allocating and returning the unique IP address, and a method for handling a case where the LAN device fails to receive a response from the router after sending a unique IP allocation request. Also, the case where the LAN device fails to return the allocated unique IP address after using it. However, since it is not necessary to consider such cases when explaining the novel procedure for allocating and returning the unique IP address, the detailed description will be avoided.

As described above, even the terminal device which is not exclusively allocated the unique IP address can use the unique IP address for a limited period of time. Therefore, even in the case where the unique IP addresses are not provided as many as the number of the LAN devices, it is possible to use the protocol which was not conventionally supported, e.g., the ITU H.323 protocol. In addition, the router and the application will have almost no additional loads.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for using an IP address on a LAN including a router and a LAN device, performed in the router, comprising:

upon receipt of a unique IP address request from the LAN device, allocating a non-used unique IP from a dynamic unique IP address pool having a plurality of unique IP addresses to the LAN device, and storing the allocated unique IP address corresponding to a LAN IP address of the LAN device in a unique IP address allocation table;

upon receipt of a packet from the LAN device, determining whether the origination party's IP address of the packet is registered in the unique IP address allocation table;

when the origination party's IP address is not registered in the unique IP address allocation table, changing the origination party's IP address of the packet to a unique IP address of the router to transmit the packet to the Internet;

when the origination party's IP address is registered in the unique IP address allocation table, changing the origination party's IP address of the packet to a unique IP address corresponding to the origination party's IP address, to transmit the packet to the Internet; and when the allocated unique IP address is returned from the LAN device, adding the allocated unique IP address returned from the LAN device to the dynamic unique IP address pool, and deleting the returned unique P address and its corresponding LAN IP address in the unique IP address allocation table.

2. The method as claimed in claim 1, further comprising:

upon receipt of a packet from the Internet, determining whether the received IP address of the packet is registered in the unique IP address allocation table;

when the received IP address is not registered in the unique IP address allocation table, changing the received IP address of the packet to a LAN IP address which is an origination party's IP address having been changed to the unique IP address of the router, to transmit it to the LAN device;

when the received IP address is registered in the unique IP address allocation table, changing the received IP address of the packet to a LAN P address corresponding to the received IP address, to transmit the packet to the LAN device.

3. A system for using an IP address on a LAN comprising:

a LAN device, connected to a router, for sending a request for a unique IP address allocation to the router, when an Internet application is started and it is determined that it is necessary to use a unique IP address, performing the application after receiving an allocated unique IP address from the router, transmitting to the router a packet to be transmitted to the Internet by using an origination party's IP address as the LAN device's own LAN IP address, and returning the allocated unique IP address to the router after using the allocated unique IP address; and the router, connected to the LAN device, for receiving the request for the unique IP address from the LAN device and allocating a non-used unique IP address of a plurality of unique IP addresses to the LAN device;

wherein a packet received from a LAN device which is not allocated the unique IP address is transmitted to the Internet changing the origination party's IP address to a unique IP address of the router, and a packet received from a LAN device which is allocated the unique IP address is transmitted to the Internet changing the origination party's IP address to the allocated unique IP address.

4. The system as claimed in claim 3, wherein when the received IP address receives a packet being the allocated unique IP address from the Internet, said router changes the received IP address of the packet to a LAN IP address corresponding to the allocated unique IP address to transmit the packet to the LAN device.

5. The system as claimed in claim 4, wherein said LAN device informs the allocated unique IP address, when it is necessary for an application performed in the LAN device to inform the other party of the LAN device's own IP address.

6. The system as claimed in claim 3, wherein said LAN device informs the allocated unique IP address, when it is necessary for an application performed in the LAN device to inform the other party of the LAN device's own IP address.

7. A method for using an IP address on a LAN including a router and a LAN device, performed in the router, comprising:

allocating a non-used unique IP from a dynamic unique IP address pool having a plurality of unique IP addresses to the LAN device, if a unique IP address request from the LAN device is received;

storing the allocated unique IP address corresponding to a LAN IP address of the LAN device in a unique IP address allocation table;

transmitting, from the LAN device, a packet including an origination party's IP address;

receiving the transmitted packet and thereafter determining whether the origination party's IP address included in the packet is registered in the unique IP address allocation table; and changing the origination party's IP address included in the packet to one of the allocated unique IP address and a unique IP address of a router, based on the determination.

8. The method of claim 7, wherein the origination party's IP address included in the packet is changed to the allocated unique IP address and thereafter transmitted to the Internet, upon determining that the origination party's IP address is registered in the unique IP address allocation table.

9. The method of claim 7, wherein the origination party's IP address included in the packet is changed to the unique IP address of the router and thereafter transmitted to the Internet, upon determining that the origination party's IP address is not registered in the unique IP address allocation table.

10. The method of claim 7, wherein the origination party's IP address included in the packet is changed to the allocated unique IP address and thereafter transmitted to the Internet, upon determining that the origination party's IP address is registered in the unique IP address allocation table; and the origination party's IP address included in the packet is changed to the unique IP address of the router and thereafter transmitted to the Internet, upon determining that the origination party's IP address is not registered in the unique IP address allocation table.

* * * * *